Feb. 2, 1932.  F. WALCOTT  1,843,499
SIPHON EGG PICKER AND TROUGH CLEANER
Filed July 19, 1929  2 Sheets-Sheet 1
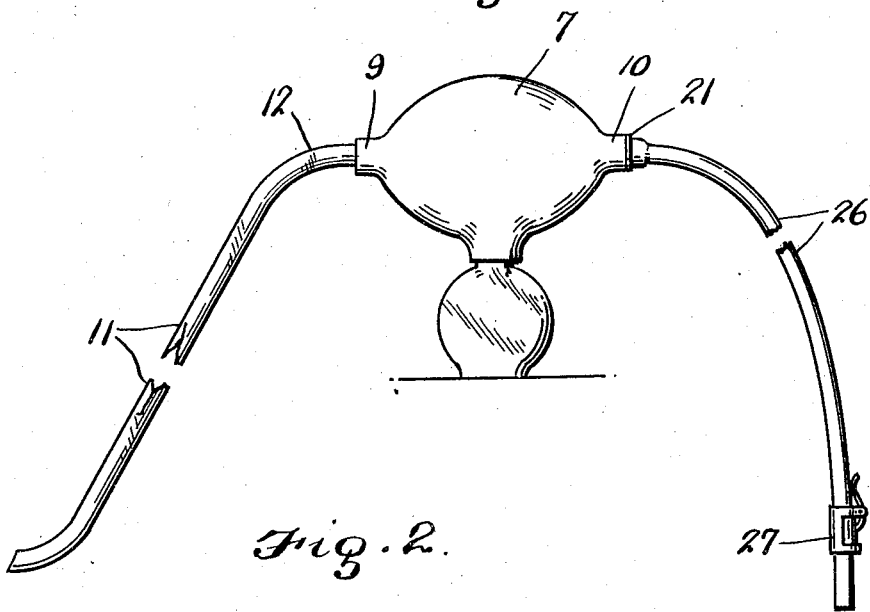
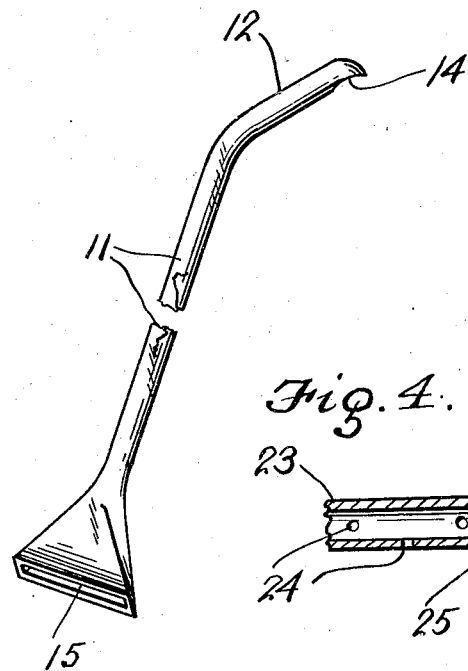
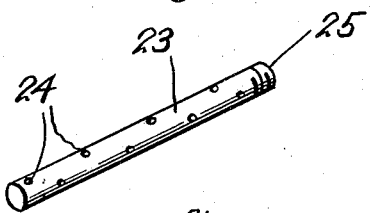
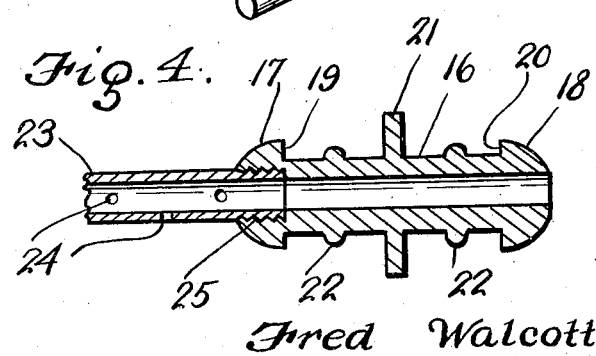
Inventor
Fred Walcott
By Clarence A. O'Brien
Attorney

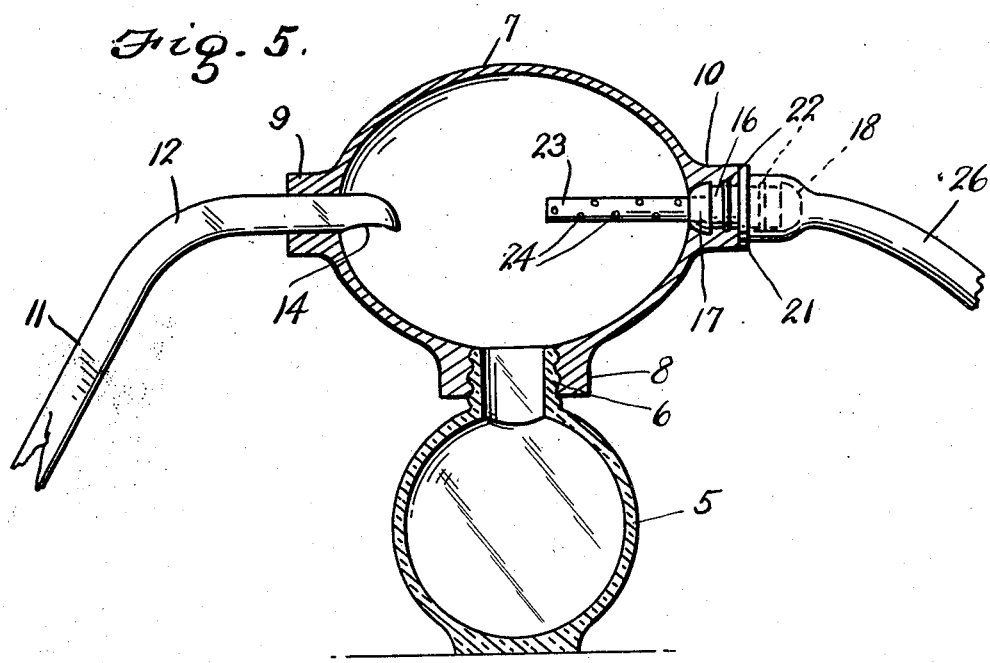
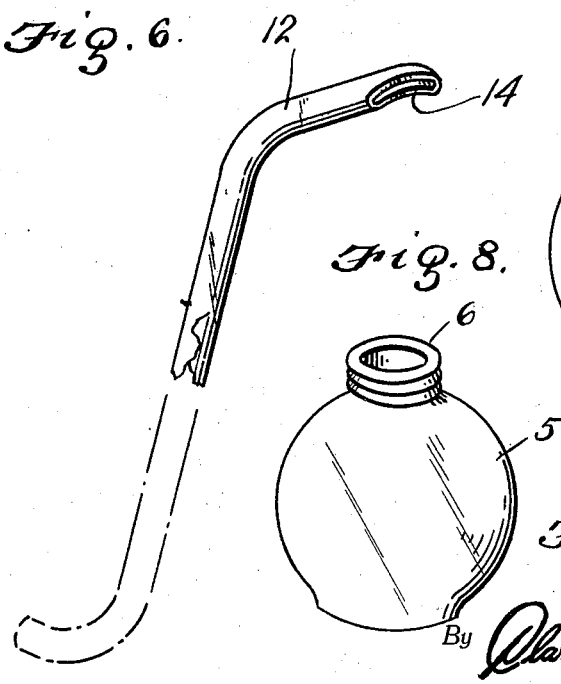
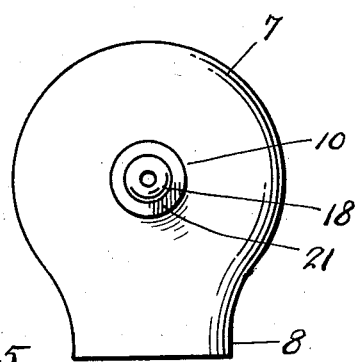

Patented Feb. 2, 1932

1,843,499

UNITED STATES PATENT OFFICE

FRED WALCOTT, OF TROY, MONTANA

SIPHON EGG PICKER AND TROUGH CLEANER

Application filed July 19, 1929. Serial No. 379,557.

The present invention relates to an egg picker and trough cleaner operated by siphons, and has for its prime object to provide means whereby to facilitate the picking of unfertile fish eggs from those that are fertile.

Another very important object of the invention resides in the provision of an apparatus of this nature which may by a certain change be converted into a trough cleaner.

A still further important object of the invention resides in the provision of an apparatus of this nature which is simple in construction, inexpensive to manufacture, strong and durable, thoroughly efficient and reliable in use, and otherwise well adapted to the purpose for which it is designed.

Numerous other objects and advantages of the invention will appear as the description proceeds, and a clear understanding of the invention will be obtained from a study of the following description, taken in connection with the accompanying drawings, wherein:

Figure 1 is a side elevation of the apparatus embodying the features of my invention.

Figure 2 is a perspective view of the inlet conduit.

Figure 3 is a perspective view of the screen tube.

Figure 4 is a sectional view through the screen tube and the coupling member for securing the tube to the siphon tube.

Figure 5 is a sectional view through the apparatus.

Figure 6 is another perspective view of the inlet conduit showing particularly the upper end.

Figure 7 is an end elevation of the bulb.

Figure 8 is a perspective view of the bowl.

Referring to the drawings in detail it will be seen that 5 denotes a glass bowl with an externally threaded neck 6 at the upper end thereof, while the numeral 7 designates a rubber bulb having an internally threaded neck 8 depending therefrom for engagement over the neck 6. An inlet neck 9 projects from one end of the bulb and an outlet neck 10 projects from the other end of the bulb.

A glass tube 11 has an upper curved end 12 insertable through the neck 9 and has an opening 14 in the bottom of its inner extremity and at the bottom end of the glass tube 11 is formed a fan-shaped intake seat 15.

As shown in Figures 3 to 5 inclusive the invention further comprehends the provision of a suitable coupling member designated generally by the reference character 16. The tubular coupling 16 is provided at opposite ends with enlarged heads 17 and 18 respectively. The heads 17 and 18 forming the shoulders 19 and 20 respectively. Intermediate the shoulders 19 and 20 the tube is provided on its outer periphery with a circumferentially extending flange or collar 21. Between the respective heads 17 and 18 and the collar 21 the coupling 16 is further provided with circumferentially extending beads 22—22.

A tubular screen 23 is perforated as indicated at 24, and at one end of the tubular screen the same is externally threaded as at 25 and has its threaded end 25 threadedly engaged within the head 17 of the coupling 16 as indicated to advantage in Figure 4.

In practice, the forward end of the coupling 16 is inserted through the outlet neck 10, the material forming the neck 10 being of rubber, will of course grip the said end of the coupling 16 at the shoulder 19 and the bead 22, the outer end of the neck 10 abutting against the adjacent face of the collar 21 thus securely maintaining the coupling member within the neck. The screen 23 projecting forwardly from the head 17 extends through the bulb 7, the inner of which is in opposed relation with respect to the inner end of the glass tube 11, as shown to advantage in Figure 5.

A siphon hose 26 has one end thereof engaged over the head 18 and bead 20 of the coupling 16, said one end of the siphon hose 26 abutting the adjacent face of the collar 21 as also shown to advantage in Figure 5. Thus it will be seen that the coupling 16 provides a secure connection between the screen 23 and the siphon hose 26, and also provides an unrestricted passage between said tube screen 23, and the siphon hose.

There is a continuous flow of water through the apparatus because of the siphon arrangement and therefore the eggs will be drawn through the glass tube 11 and collected in the glass bowl or reservoir 5 and there is complete control because of the siphon hose 26 and associated with the lower portion thereof I provide a clamp 27, or in lieu of the clamp the finger and thumb may be used for this purpose so as to shut off the water and hold, the eggs in any desired position.

If a fertile egg is picked up into the glass tube it can, by shutting off the flow of water to a fixed point, be ejected from the glass tube by a slight pressure on the bulb, and then, of course, the glass tube is set back in the trough and the bulb released which will suck up sufficient water to continue the flow.

When it is desired, through the medium of the coupling 16, the screen 23 may be readily withdrawn from the interior of the bulb 7, together with the coupling 16, or the screen 23 may be removed, in an obvious manner without disturbing the coupling 16 or the hose 26 secured thereto.

It is thought that the construction, operation utility and advantages of this invention will now be quite apparent to those skilled in this art without a more detailed description thereof.

The preferred embodiment of the invention has been disclosed in considerable detail merely for the purpose of exemplification, since in actual practice it attains the features of advantage enumerated as desirable in the statement of the invention and the above description.

Even though I have herein shown and described the preferred embodiment of my invention, it is to be understood that the same is susceptible to changes fully comprehended by the spirit of the invention as herein described and the scope of the appended claims.

Having thus described my invention, what I claim as new is:

1. An apparatus of the class described comprising a receptacle, a bulb connected to and mounted on the receptacle, a glass tube leading into the bulb, and a siphon connected with the bulb, said siphon connection comprising a tube extending into the bulb, and having its axis at right angles to the vertical axis of the receptacle, said last mentioned tube being perforated, and means for connecting one end of said last mentioned tube with a siphon hose.

2. An apparatus of the class described comprising a receptacle, a bulb connected to and mounted on the receptacle, a glass tube leading into the bulb, said tube having its upper end curved and its lower end in the form of a widened funnel, a perforated tube leading into the bulb from the opposite end of the bulb, and having its axis approximately parallel to the longitudinal axis of the bulb, a tubular coupling member mounted in the bulb at one end of the bulb, means for connecting said last mentioned tubular member with one end of the coupling member, said coupling member having its opposite end extending exteriorly of the bulb, and means for securing a siphon hose to said last mentioned end of the coupling member.

3. An apparatus of the class described comprising a receptacle, a bulb connected to and mounted on the receptacle, a glass tube leading into the bulb, said glass tube projecting inwardly of the bulb and having an opening in the bottom of its inner extremity, said glass tube having its lower end in the form of a widened funnel, a tubular coupling member removably secured in the bulb at one end of the bulb, a perforated tube threaded in said coupling member at one end of the coupling member and extending inwardly of the bulb, and a siphon hose secured to the other end of said coupling member exteriorly of said bulb.

In testimony whereof I affix my signature.

FRED WALCOTT.